United States Patent
La et al.

(10) Patent No.: US 10,703,632 B2
(45) Date of Patent: Jul. 7, 2020

(54) METHOD OF PURIFYING CARBON NANOTUBES

(71) Applicants: SK INNOVATION CO., LTD., Seoul (KR); SK GLOBAL CHEMICAL CO., LTD., Seoul (KR)

(72) Inventors: Yeon Hwa La, Daejeon (KR); Ji Min Kim, Daejeon (KR); Min Ji Sung, Daejeon (KR); Woong Chul Shin, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 304 days.

(21) Appl. No.: 15/694,213

(22) Filed: Sep. 1, 2017

(65) Prior Publication Data

US 2018/0065855 A1     Mar. 8, 2018

(30) Foreign Application Priority Data

Sep. 6, 2016   (KR) .................. 10-2016-0114409

(51) Int. Cl.
   *C01B 32/17*      (2017.01)
   *B82Y 30/00*      (2011.01)
   *B82Y 40/00*      (2011.01)

(52) U.S. Cl.
   CPC .............. *C01B 32/17* (2017.08); *B82Y 30/00* (2013.01); *B82Y 40/00* (2013.01);
   (Continued)

(58) Field of Classification Search
   CPC . C01B 32/17; C01B 2202/22; C01B 2202/30; C01B 32/158; C01B 32/159; C01B 32/16; C01B 32/162; C01B 32/164; C01B 32/166; C01B 32/168; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/24; C01B 2202/26; C01B 2202/28;
   (Continued)

(56) References Cited

U.S. PATENT DOCUMENTS

| 6,752,977 B2 | 6/2004 | Smalley et al. |
| 7,090,819 B2 | 8/2006 | Smalley et al. |
| 8,628,748 B2 | 1/2014 | Takimoto et al. |

FOREIGN PATENT DOCUMENTS

| CN | 1436722 A | 8/2003 |
| CN | 104401963 A | 3/2015 |

(Continued)

OTHER PUBLICATIONS

Huang, et al., 99.9% purity multi-walled carbon nanotubes by vacuum high-temperature annealing, Carbon 2003; 41: 2585-2590 (Year: 2003).*

Antunes, et al., Thermal Annealing and Electrochemical Purificaiton of MWCNTs Produced by Camphor/Ferrocene Mixtures, Journal of Nanoscience and Nanotechnology 2010; 10: 1296-1303 (Year: 2010).*

(Continued)

*Primary Examiner* — Daniel C. McCracken
(74) *Attorney, Agent, or Firm* — Abelman, Frayne & Schwab (57) ABSTRACT

Disclosed is a method of purifying carbon nanotubes, including treating carbon nanotubes with an inert gas at a high temperature in a low vacuum in a reactor and obtaining ultrapure carbon nanotubes, wherein the ultrapure carbon nanotubes contain 50 ppm or less of each metal remaining therein.

7 Claims, 6 Drawing Sheets

(52) U.S. Cl.
CPC ...... *C01B 2202/22* (2013.01); *C01P 2006/80* (2013.01); *Y10S 977/742* (2013.01); *Y10S 977/845* (2013.01)

(58) Field of Classification Search
CPC ............ C01B 2202/32; C01B 2202/34; C01B 2202/36; B82Y 30/00; B82Y 40/00; C01P 2006/80; Y10S 977/742; Y10S 977/845
See application file for complete search history.

(56) References Cited

FOREIGN PATENT DOCUMENTS

| | | |
|---|---|---|
| JP | 2005097024 | 4/2005 |
| JP | 2010018451 | 1/2010 |
| KR | 101137209 | 4/2012 |

OTHER PUBLICATIONS

Chen, et al., The structural evolution of thin multi-walled carbon nanotubes during isothermal annealing, Carbon 2007; 45: 274-280 (Year: 2007).*
Andrews, et al., Purification and structural annealing of multiwalled carbon nanotubes at graphitization temperatures, Carbon 2001; 39: 1681-1687 (Year: 2001).*
Kuznetsov, et al., "Multi-walled carbon nanotubes with ppm level of impurities," Phys. Status Solidi B., 247(11-12):2695-2699 (2020).
Corresponding Korean patent application search report.
Corresponding Korean patent application Notice of Allowance.
Corresponding Korean Patent Application first Office Action.
Corresponding Korean Patent Application Second Office Action.

* cited by examiner

METHOD OF PURIFYING CARBON NANOTUBES

CROSS-REFERENCE TO RELATED APPLICATION

This application claims the benefit of Korean Patent Application No. 10-2016-0114409, filed Sep. 6, 2016, entitled "Method for purifying carbon nanotubes", which is hereby incorporated by reference in its entirety into this application.

BACKGROUND OF THE INVENTION

1. Technical Field

The present invention relates to a method of purifying carbon nanotubes, and more particularly to a method of removing metal impurities remaining in carbon nanotubes by treating carbon nanotubes with an inert gas at a high temperature in a low vacuum.

2. Description of the Related Art

Carbon nanotubes (CNTs) are a carbon allotrope composed of carbon, and configured such that one carbon atom is coupled in a hexagonal honeycomb shape with other carbon atoms to form a tube, the diameter of the tube being very small, on the nanometer (nm=a one-billionth of a meter) scale.

Carbon nanotubes, having highly desirable properties, have a specific structure that are characterized by the tube diameter, symmetry, layer structure, bundle structure, bond deformation, and the presence of impurities, and may thus be effectively utilized in various fields of nanotechnology, electrical engineering, optical and material engineering, etc. In particular, carbon nanotubes are known to be a new material having outstanding field emission properties, high-efficiency hydrogen storage medium properties, etc.

Nanotubes have a fullerene-based structure, with a long hollow tube shape configured such that a membrane composed of a carbon atom monolayer called graphene is provided as a wall, and are thus referred to as carbon nanotubes. Different types of nanotubes may be formed depending on the angle at which the graphene is rolled round, and may take on the properties of a metal or semiconductor depending on the rolling angle and the diameter. The basic structure of nanotubes may be classified into single-walled nanotubes (SWNTs) and multi-walled nanotubes (MWNTs).

A carbon nanotube composite is highly applicable to conductive materials, high-strength lightweight structural materials, multifunctional composite materials, and the like, and in the field of carbon nanotubes, thorough research is ongoing into the preparation of carbon nanotubes, modification thereof, various properties of carbon nanotube composites and application fields therefor. Examples of application fields thereof may include electron emission sources of diverse devices, VFDs (Vacuum Fluorescent Displays), white light sources, FEDs (Field Emission Displays), lithium ion secondary battery electrodes, hydrogen storage fuel cells, nanowires, nanocapsules, nanotweezers, AFM/STM tips, single-electron devices, gas sensors, medical and engineering micro-parts, high-functional composites, etc. For industrial applications of carbon nanotubes, it is important to economically synthesize and purify carbon nanotubes having excellent properties through advanced synthesis techniques.

Examples of the method of synthesizing carbon nanotubes may typically include arc discharge, laser ablation, chemical vapor deposition (CVD) and the like. Here, arc discharge or laser ablation may increase the purity of carbon nanotubes but suffers from difficulty of mass production and expensive equipment. In CVD, a catalyst CVD process makes it easy to control the diameter, length, density, structure and crystallinity of carbon nanotubes and makes it possible to achieve mass production of highly pure products. A metal catalyst mainly includes an alumina or silica catalyst supported with Fe, Co, Ni, or Mo.

The carbon nanotubes synthesized through a catalyst process may contain various nanocarbon materials, amorphous carbon and transition metals acting as a catalyst for growth thereof. Owing to such impurities, carbon nanotubes are cleaved and thus the length thereof is decreased or the surface thereof is oxidized, thus deteriorating electrical and mechanical properties, which is undesirable. Consequently, such impurities may damage the inherent properties of carbon nanotubes and may thus limit the optimal performance of carbon nanotubes in application fields.

Particularly, in carbon nanotubes for use in battery electrodes, the metal may break the battery separator, to thus cause an explosion. Hence, the metal content is controlled to the order of ppm.

In order to remove transition metals and carbon-containing materials, a variety of purification methods have been reported, and may be mainly classified into chemical and physical methods.

Examples of chemical purification methods may include vapor oxidation methods and liquid oxidation methods. Examples of the gas oxidant may include air, $Cl_2$, HCl, $SF_6$, and $H_2S$ and examples of the liquid oxidant may include nitric acid, hydrogen peroxide, hydrochloric acid, sulfuric acid, and phosphoric acid. The use of nitric acid, sulfuric acid or hydrochloric acid is economically effective, but the metal catalyst encapsulated in the tube is difficult to remove, making it impossible to obtain ultrapure carbon nanotubes. Also, U.S. Pat. No. 8,628,748 discloses a method of purifying carbon nanotubes through thermal treatment using a halogen gas and/or a halogen compound, and U.S. Pat. No. 6,752,977 discloses a method of thermally treating carbon nanotubes at 200 to 500° C. using a halogen-containing gas. However, the case where the halogen-containing compound is used is problematic because of the inconvenience of halogen gas handling, environmental risk, and high investment cost.

Examples of physical purification methods may include sonication, high-temperature annealing, supercritical fluid $CO_2$ extraction, and the like. Among them, the high-temperature annealing method is known to cause graphitization to thus decrease the incidence of chemical surface defects and effectively remove metal. Andrews et al. have reported the purification of multi-walled carbon nanotubes (MW-CNTs) through treatment at 3000° C. for 45 min in a nitrogen gas atmosphere slightly higher than atmospheric pressure so that Fe content is controlled to 100 ppm or less (Carbon 39 (2001) 1681-1687), and Chen et al. have reported the purification of MWCNTs through treatment at 2000° C. or more in an argon gas atmosphere so that Fe content is controlled to 100 ppm or less (Carbon 45 (2007) 274-280). Based on the results of research of Huang et al., it was reported that MWCNTs are treated under conditions of $10^{-3}$ Pa to 10 Pa and 2000° C. or more for 5 hr to remove Al$_2$O$_3$ and Fe—Mo (Carbon 41 (2003) 2585-2590). As such, the reaction pressure of Huang et al. has to be very low. According to CN 1436722A, 86% MWCNTs are treated in a 20 Pa vacuum at 2300° C. for 5 hr, thus yielding highly pure carbon nanotubes having a purity of 99.93% and a transition metal content of 0.05% or less. Here, CN 1436722 requires a very low reaction pressure and a very high reaction temperature. As described above, high-temperature annealing methods reported to date are mostly performed under harsh conditions, including a high temperature of 2000° C. or more or a very low vaccuum, that is, a high vacuum, thus increasing manufacturing costs, which is undesirable.

Also, conventional techniques may include the use of halogen gas or oxygen gas to remove metal impurities. Although the oxidation process using halogen gas is very effective at purifying carbon nanotubes, it suffers from a long treatment time, poor processing stability due to the toxic gas, and disposal of impurities and byproducts formed upon gas treatment.

Moreover, among metal impurities, Fe is known to be the metal impurity that is the most difficult to remove. Conventional techniques for reducing Fe content to 10 ppm or less are known to deteriorate the dispersibility of carbon nanotubes.

Carbon nanotubes are considerably difficult to disperse owing to the long length thereof relative to the diameter and the strong intermolecular force thereof. Since the total surface area of carbon nanotubes increases even when added in the same amount depending on the extent of dispersion thereof, the physical, electrical, and thermal properties thereof may vary greatly. Thus, dispersibility is a very important factor in the application fields of carbon nanotubes. In particular, when the dispersibility of carbon nanotubes is low in battery application fields, electrical conductivity may be adversely affected.

Thorough research into methods of removing impurities from carbon nanotubes is being carried out, but techniques that are able to economically remove metal impurities, especially Fe, to the order of ones of ppm, and to ensure the dispersibility of carbon nanotubes are still insufficient.

SUMMARY OF THE INVENTION

Accordingly, an aspect of the present invention is to provide a method of purifying carbon nanotubes, which is very effective at removing a metal catalyst or metal oxide even without using harsh conditions of a high temperature and a high vacuum or using halogen-containing gas, unlike conventional methods of purifying carbon nanotubes.

Another aspect of the present invention is to provide ultrapure carbon nanotubes, prepared by the above method of purifying carbon nanotubes.

Still another aspect of the present invention is to provide ultrapure carbon nanotubes, containing 50 ppm or less of each metal impurity therein.

Yet aspect of the present invention is to provide ultrapure carbon nanotubes, containing 50 ppm or less of Fe therein.

A first aspect of the present invention provides a method of purifying carbon nanotubes, including (1) treating carbon nanotubes with an inert gas at a treatment temperature of 1800° C. or less in a low vacuum at a reaction pressure of 0.1 Torr or more in a reactor and (2) obtaining ultrapure carbon nanotubes, wherein the ultrapure carbon nanotubes contain 50 ppm or less of each metal remaining therein.

In an embodiment according to the first aspect, when the metal remaining in the ultrapure carbon nanotubes is Fe, Fe is present in an amount of 10 ppm or less.

In an embodiment according to the first aspect, the low vacuum is set at a reaction pressure ranging from 0.1 Torr to 1 Torr.

In an embodiment according to the first aspect, the treatment temperature ranges from 1600° C. to 1800° C.

In an embodiment according to the first aspect, the inert gas is used in an amount of 0.0025 to 0.25 times the volume of the reactor per minute.

In an embodiment according to the first aspect, treating the carbon nanotubes is performed for 15 min to 120 min.

In an embodiment according to the first aspect, the remaining metal includes Fe, Co, Al$_2$O$_3$, Mg and a combination thereof.

In addition, carbon nanotubes, prepared by the above method, contain 50 ppm or less of each metal remaining therein.

Furthermore, when the metal remaining in the ultrapure carbon nanotubes is Fe, Fe is present in an amount of 10 ppm or less.

Furthermore, the carbon nanotubes have an electrical resistance of $1.0 \times 10^2$ to $5.0 \times 10^2$ Ω/sq.

According to the present invention, carbon nanotubes are merely treated at a high temperature in a low vacuum using an inert gas, whereby metal impurities can be effectively removed therefrom, and the resulting ultrapure carbon nanotubes contain 50 ppm or less of each metal impurity and have high dispersibility.

DESCRIPTION OF SPECIFIC EMBODIMENTS

Exemplary embodiments of the present invention may be understood through the following description. The following description should be understood to explain specific embodiments of the present invention, and the present invention is not necessarily limited thereto. Furthermore, the appended drawings are provided for clarity, and the present invention is not limited thereto, and details of the individual components thereof may be clearly understood through the specific effects of the relevant description, which will be described later.

The terms used herein may be defined as follows.

The term "ultrapure carbon nanotubes" may refer to carbon nanotubes configured such that the amount of each metal impurity remaining therein is 50 ppm or less.

The term "low vacuum" refers to a vacuum of 1 Torr or less.

The term "metal remaining in carbon nanotubes" may refer to any impurity incorporated during the synthesis of carbon nanotubes, and is mainly a metal used as the catalyst.

The term "metal vapor pressure" may refer to a vapor pressure when a vapor is in dynamic equilibrium with the solid or liquid at predetermined pressure and temperature.

An aspect of the present invention addresses a method of purifying carbon nanotubes, including treating carbon nanotubes with an inert gas under conditions of a high temperature and a low vacuum in a reactor and obtaining ultrapure carbon nanotubes, wherein the ultrapure carbon nanotubes contain 50 ppm or less of each metal remaining therein.

In the present invention, the removal of metal impurities may be performed by vaporizing metal impurities, whereby the metal content may be controlled to the order of ones of ppm, compared to other purification methods such as acid treatment, etc.

Removing the metal impurities through vaporization is conventionally performed in a manner in which metal is oxidized using halogen gas and then vaporized or through a high-temperature annealing process including vaporization at a high temperature in a high vacuum. Here, halogen gas is typically used at 900 to 1400° C. However, the use of halogen gas may cause problems related to processing stability, high manufacturing costs, and a long treatment time. Moreover, the high-temperature annealing process through vaporization at a high temperature in a high vacuum is conducted under harsh conditions, undesirably leading to high manufacturing costs.

In the present invention, metal impurities may be effectively removed even without the use of halogen gas and harsh conditions.

Figure 1:
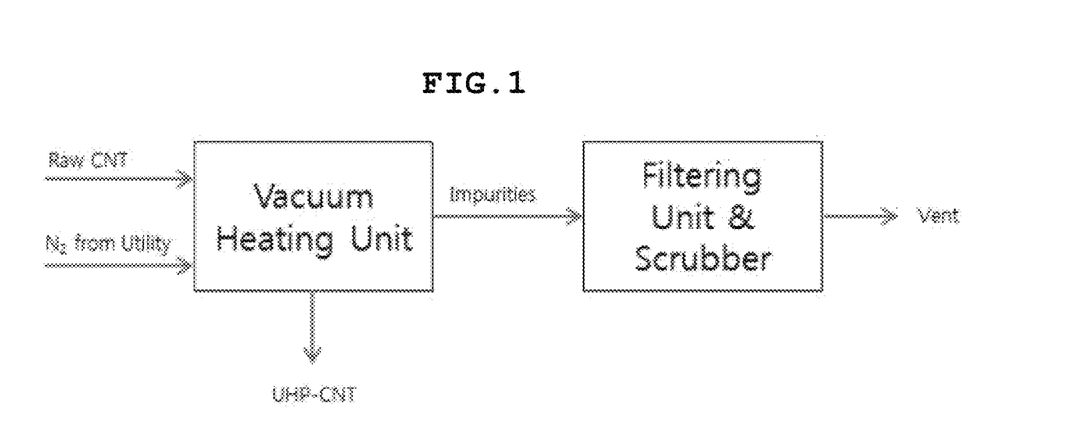
FIG. 1 shows a CNT purification process.

FIG. 1 shows a CNT purification process according to the present invention.

Raw carbon nanotubes are loaded in a vacuum heating unit equipped with a high-temperature furnace and a vacuum pump and then treated at a high temperature in a low vacuum while allowing nitrogen to flow, after which ultrapure carbon nanotubes are obtained. The removed impurities are collected by a filter and a scrubber.

In the present invention, the CNT purification process for removing metal impurities is carried out in a manner in which metal is vaporized into gas, after which the vaporized metal impurities are removed.

Vaporizing the metal is known to require a high temperature and a high vacuum. However, when the temperature is increased higher than 1800° C., the generation of metal vapor pressure may increase, but the dispersibility of purified carbon nanotubes may decrease owing to graphitization. Furthermore, a high vacuum requires bulky equipment and is problematically uneconomical.

In the present invention, metal impurities may be vaporized even without the use of reactive gas such as halogen or oxygen gas and even without harsh conditions such as an ultrahigh temperature and an ultrahigh vacuum, whereby the metal impurities may be effectively removed using the inert gas.

According to the present invention, when metal impurities in the carbon nanotubes are Fe, Co, $Al_2O_3$ and Mg, the reaction pressure may be 1 Torr or less, and particularly 0.1 to 1 Torr. The case where the reaction pressure increases is undesirable because it affects the vaporization of metal to be removed.

The method of the present invention includes treating the carbon nanotubes with the inert gas in a reactor at a high temperature in a low vacuum. The treatment temperature is 1400° C. or more, and particularly 1600 to 1800° C. If the temperature is less than 1400° C., it is difficult to remove metal. On the other hand, if the temperature is higher than 1800° C., dispersibility may decrease and manufacturing costs may increase. The inert gas is not particularly limited, but may be nitrogen.

According to an embodiment of the present invention, the amount of the inert gas is closely associated with the reaction pressure, and thus the amount of the inert gas has to be set within a range that does not impair the low vacuum of the present invention. In an embodiment, when the inert gas is allowed to flow in a large amount using the same pump, the vacuum level may decrease. Also, when the inert gas is allowed to flow in a large amount, a large pump capacity is required in order to maintain a certain vacuum, which may affect manufacturing costs.

In an exemplary embodiment, when the inert gas is allowed to flow at 2 L/min and 4 L/min into a reactor having a volume of 22 L, the amount of the inert gas is 0.09 times and 0.18 times the volume of the reactor per minute, respectively. Particularly, the amount of the inert gas may be 0.0025 to 0.25 times the volume of the reactor per minute. If the amount thereof is less than 0.0025 times, metal may not be efficiently removed. On the other hand, if the amount thereof exceeds 0.25 times, the capacity of the pump may need to be increased, and carbon nanotubes may be lost.

In an embodiment of the present invention, the treatment time with the inert gas may be 15 min or more. If the treatment time is less than 15 min, metal may not be efficiently removed.

In the treatment of metal impurities according to the present invention, the low vacuum may be, but is not limited to, a pressure lower than the vapor pressure of the metal remaining in the carbon nanotubes. Examples of the metal remaining in the carbon nanotubes may include Fe, Co, $Al_2O_3$, Mg and combinations thereof, but the present invention is not limited thereto.

When the metal impurities in the carbon nanotubes are Fe, Co, $Al_2O_3$ and Mg, the reaction pressure may be 1 Torr or less, and particularly 0.1 to 1 Torr.

In the present invention, the purified carbon nanotubes may have a purity of 99% or more, and the amount of each metal impurity therein may be 50 ppm or less.

According to the present invention, the purified ultrapure carbon nanotubes may exhibit high dispersibility, and may be safely used for a long lifetime when applied to batteries.

According to the present invention, the purified carbon nanotubes may have an electrical resistance of $1.0 \times 10^2$ to $5.0 \times 10^2$ Ω/sq and thus high dispersibility. The electrical resistance of carbon nanotubes is determined in a manner in which electrical resistance values at five points (top, bottom, left, right, and center) of the carbon nanotubes are measured using an electrical resistance meter and then averaged. The electrical resistance may vary depending on the extent of dispersion of carbon nanotubes. In the case where the carbon nanotubes are not dispersed well, electrical resistance is high or cannot be measured.

EXAMPLES

Method of Purifying Carbon Nanotubes

The carbon nanotubes used for testing were prepared using a catalyst CVD process. After purification treatment, the amounts of metal components remaining in the carbon nanotubes were analyzed using ICP-OES (Inductively Coupled Plasma-Optical Emission Spectroscopy, Agilent).

ICP pretreatment was performed in a manner in which carbon nanotubes were carbonized with sulfuric acid and then ashed in a furnace at 800° C.

The method of purifying carbon nanotubes is as follows.

(1) Carbon nanotubes to be purified are placed in a graphite crucible and loaded in a high-temperature vacuum-firing furnace.

(2) When a vacuum of 1 Torr or less is maintained, a predetermined amount of inert gas is allowed to flow.

(3) The temperature is increased to the treatment temperature, after which treatment is performed for 15 to 120 min.

(4) The temperature is cooled to room temperature, after which the vacuum is removed and the sample is unloaded.

Example 1

23 g of carbon nanotubes (purity of 80 to 85%) were treated under conditions of 1800° C., 0.5 to 1 Torr, and nitrogen of 2 L/min for 120 min, and the volume of the reactor was 22 L. The metal components of the purified carbon nanotubes were analyzed using ICP. The results of residual metal content and metal removal are shown in Table 1 below.

Comparative Example 1

The removal of metal impurities was performed in the same manner as in Example 1, with the exception that nitrogen treatment was not conducted. The results of residual metal content and metal removal are shown in Table 1 below.

Comparative Example 2

The removal of metal impurities was performed in the same manner as in Example 1, with the exception that the reaction pressure was set to 2 Torr in lieu of 0.5 to 1 Torr. The results of residual metal content and metal removal are shown in Table 1 below.

Comparative Example 3

The removal of metal impurities was performed in the same manner as in Example 1, with the exception that the reaction pressure was set to 3 Torr in lieu of 0.5 to 1 Torr. The results of residual metal content and metal removal are shown in Table 1 below.

The results of removal of metal impurities of Example 1 and Comparative Examples 1 to 3 are given in Table 1 below.

upon nitrogen-free treatment, but Fe or Co was not effectively removed upon nitrogen-free treatment, as in the nitrogen treatment.

In Comparative Examples 2 and 3, in which the reaction pressure exceeded 1 Torr, the respective purities of carbon nanotubes were 99.7% and 99.6%, which means that the effect of removing impurities was low compared to when the reaction pressure was 1 Torr or less. In particular, when the reaction pressure was high, $Al_2O_3$ or Fe was not completely removed but was left behind.

Example 2

Figure 2:
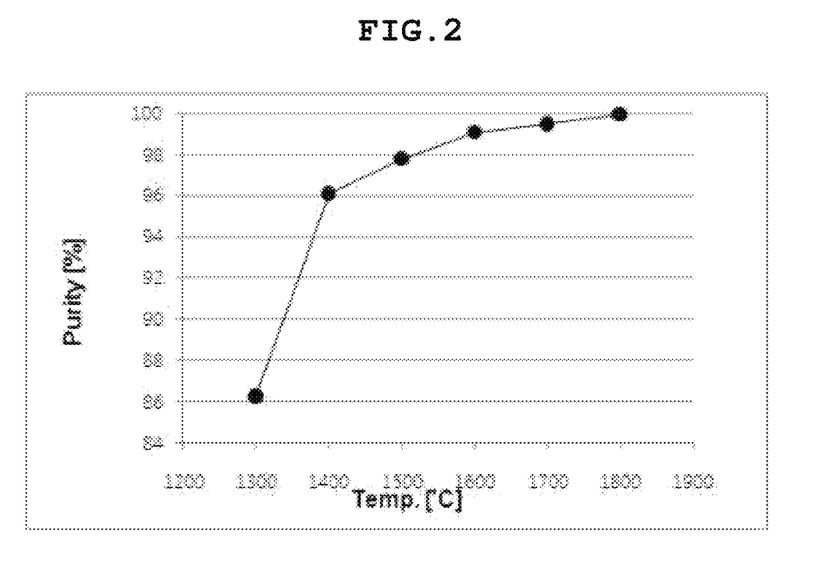
FIG. 2 shows the purity (%) of CNTs depending on the treatment temperature.

Raw carbon nanotubes were treated for 90 min at different treatment temperatures under conditions of nitrogen of 2 L/min and a reaction pressure of 0.5 to 1 Torr. The purity values of raw carbon nanotubes depending on the treatment temperature were measured. The results are shown in FIG. 2. The amounts of metal impurities such as $Al_2O_3$, Fe, Co and Mg depending on the treatment temperature were measured. The results are shown in FIG. 3.

As shown in FIG. 2, the purity of carbon nanotubes was increased with an increase in the treatment temperature but was drastically increased at 1300° C. to 1400° C. and then gently increased in a temperature range higher than 1600° C.

Figure 3:
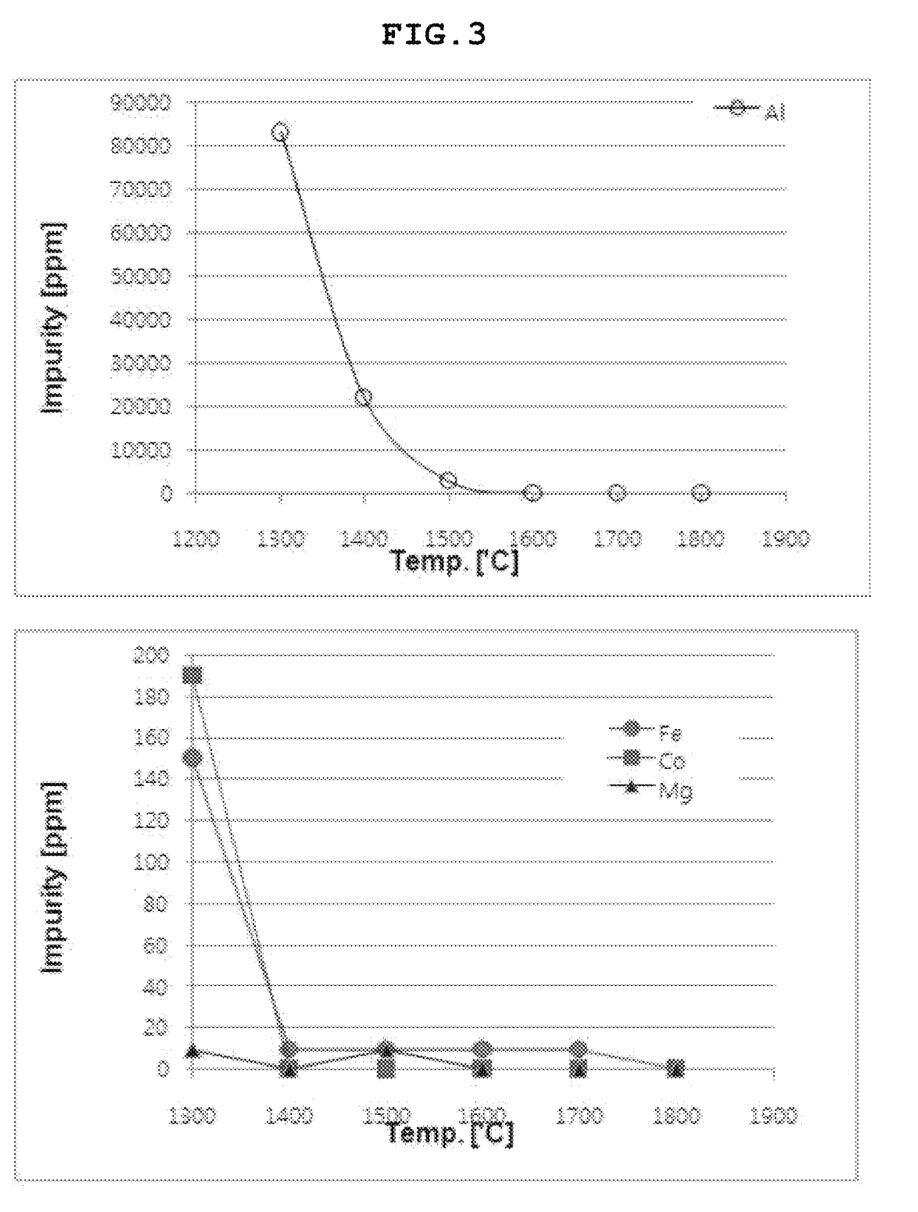
FIG. 3 shows the metal content (ppm) remaining in CNTs depending on the treatment temperature.

As shown in FIG. 3, the amounts of metal impurities remaining in the carbon nanotubes depending on the treatment temperature were drastically decreased up to 1400° C. $Al_2O_3$ was almost completely removed at 1600° C., which is slightly higher than the temperature at which Fe, Co and Mg were removed.

Example 3

Figure 4:
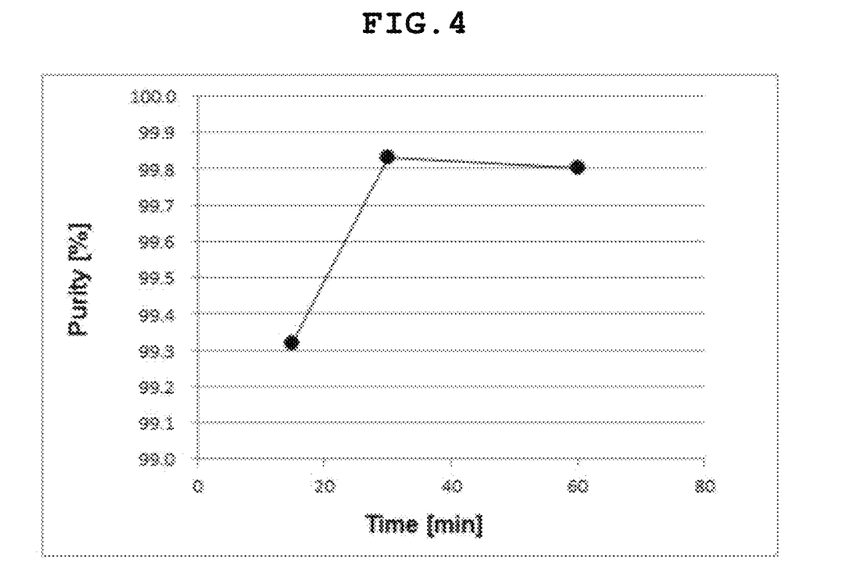
FIG. 4 shows the purity (%) of CNTs depending on the treatment time.
Figure 5:
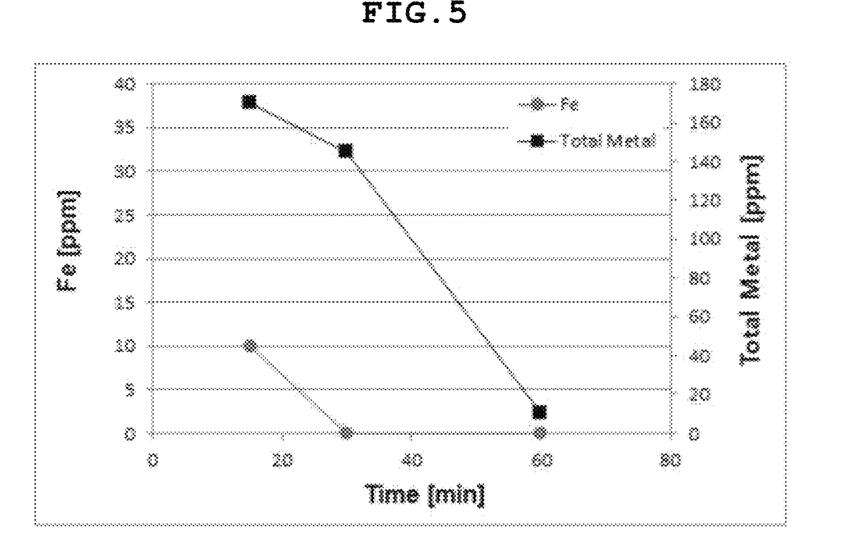
FIG. 5 shows the metal content (ppm) remaining in CNTs depending on the treatment time.

Raw carbon nanotubes were treated for different treatment times under conditions of nitrogen of 2 L/min, a reaction pressure of 0.5 to 1 Torr and a temperature of 1700° C. The purity values of raw carbon nanotubes depending on the treatment time were measured. The results are shown in FIG. 4. The amounts of metal impurities such as $Al_2O_3$, Fe, Co and Mg depending on the treatment time were measured. The results are shown in FIG. 5.

As shown in FIG. 4, the purity of carbon nanotubes was increased with an increase in the treatment time. Also, as shown in FIG. 5, the amounts of metal impurities remaining in the carbon nanotubes depending on the treatment time were drastically decreased.

Example 4

Figure 6:
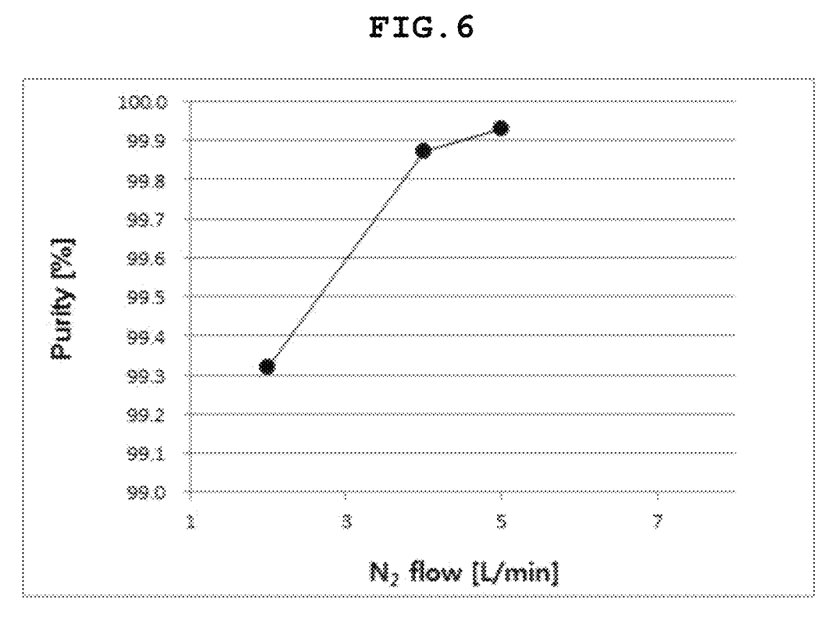
FIG. 6 shows the purity (%) of CNTs depending on the flow rate of N$_2$.
Figure 7:
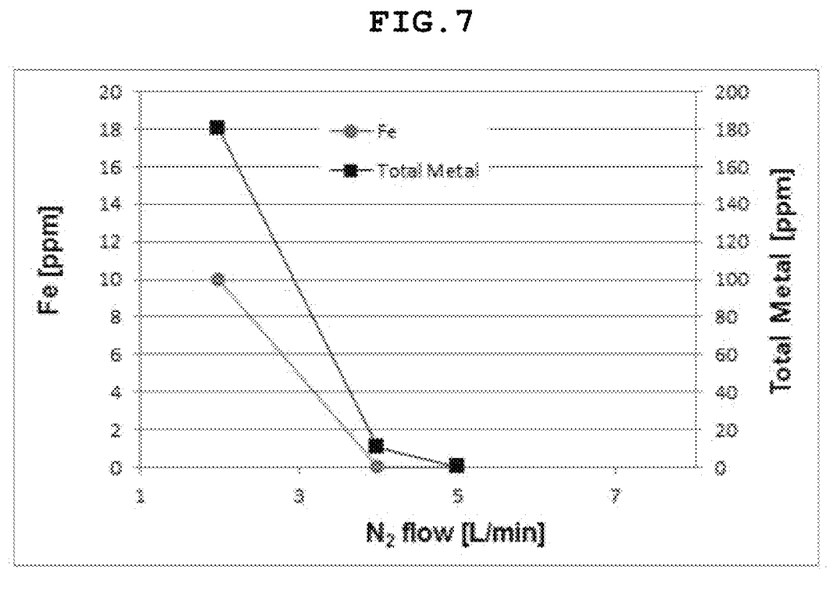
FIG. 7 shows the metal content (ppm) depending on the flow rate of N$_2$.

Raw carbon nanotubes were treated at different nitrogen flow rates at 1700° C. for 15 min. The purity values of raw

TABLE 1

|  | | Metal content (ppm) | | | | Metal removal (%) | | | |
| --- | --- | --- | --- | --- | --- | --- | --- | --- | --- |
|  | Purity (%) | $Al_2O_3$ | Fe | Co | Mg | $Al_2O_3$ | Fe | Co | Mg |
| Raw CNTs | 84.3 | 81140.0 | 3170.0 | 1580.0 | 150.0 | — | — | — | — |
| Example 1 | 99.9 | 0.0 | 6.5 | 0.0 | 0.0 | 100.0 | 99.8 | 100.0 | 100.0 |
| Comparative Example 1 | 99.7 | 0.0 | 86.0 | 14.0 | 0.0 | 100.0 | 97.3 | 99.1 | 100.0 |
| Comparative Example 2 | 99.7 | 150 | 5 | 0 | 0 | 99.8 | 99.8 | 100.0 | 100.0 |
| Comparative Example 3 | 99.6 | 90 | 10 | 0 | 0 | 99.9 | 99.7 | 100.0 | 100.0 |

As is apparent from the results of Table 1, $Al_2O_3$ or Mg was completely removed upon nitrogen gas treatment or carbon nanotubes depending on the nitrogen flow rate were measured. The results are shown in FIG. 6. The amounts of metal impurities such as $Al_2O_3$, Fe, Co and Mg depending on the treatment flow rate were measured. The results are shown in FIG. 7.

As is apparent from FIGS. 6 and 7, showing the purity of carbon nanotubes depending on the nitrogen treatment flow rate, when the nitrogen flow rate was 2 L/min (reactor volume of 22 L), the purity of carbon nanotubes was 99.3% and the total metal content was 180 ppm, and also, when the nitrogen flow rate was 4 L/min (reactor volume of 22 L), the purity of carbon nanotubes was 99.9% and the total metal content was decreased to 10 ppm or less.

Example 5

Electrical Resistance and Dispersibility of Carbon Nanotubes 10 mg of the carbon nanotubes treated at each of treatment temperatures of 1600° C., 1700° C., 1800° C. and 2500° C. was dispersed in 10 g of a 2 wt % SDS (Sodium Dodecyl Sulfate) aqueous solution using a sonicator for 5 min, filtered with a filter paper having a diameter of 16 mm, and dried at room temperature for 2 hr, after which electrical resistance values at five points (top, bottom, left, right, center) of the carbon nanotubes were measured using an electrical resistance meter and averaged. The electrical resistance values of carbon nanotubes depending on the treatment temperature are shown in FIG. 8.

Figure 8:
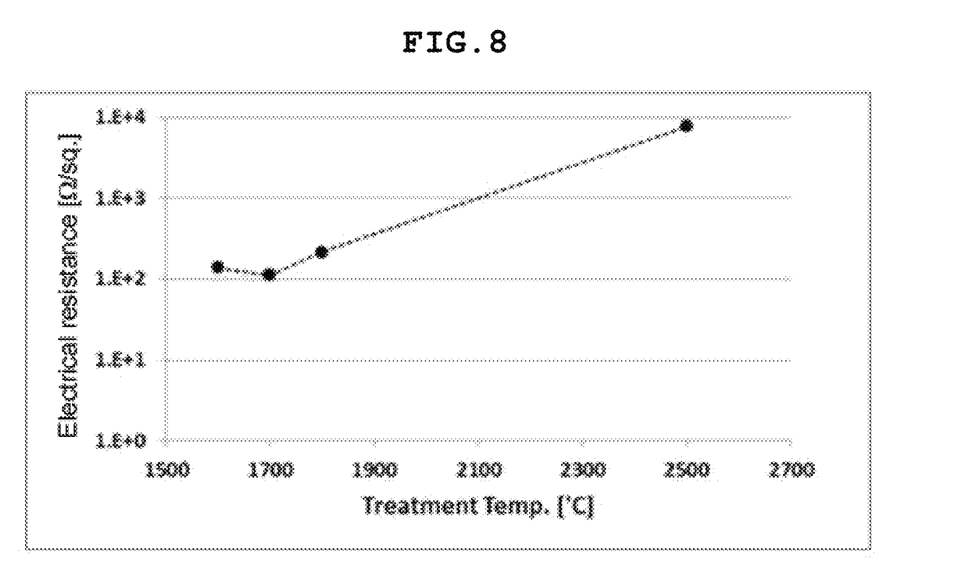
FIG. 8 shows the electrical resistance of CNTs depending on the treatment temperature.

As shown in FIG. 8, the carbon nanotubes treated at 1600° C. and 1700° C. exhibited similar electrical resistance values and good dispersibility, but the carbon nanotubes treated at 2500° C. were drastically increased in electrical resistance and were thus determined not to have dispersed well. When the electrical resistance falls in the range of $1.0 \times 10^2$ to $5.0 \times 10^2$ Ω/sq, good dispersibility is assumed to have taken place.

Figure 9:
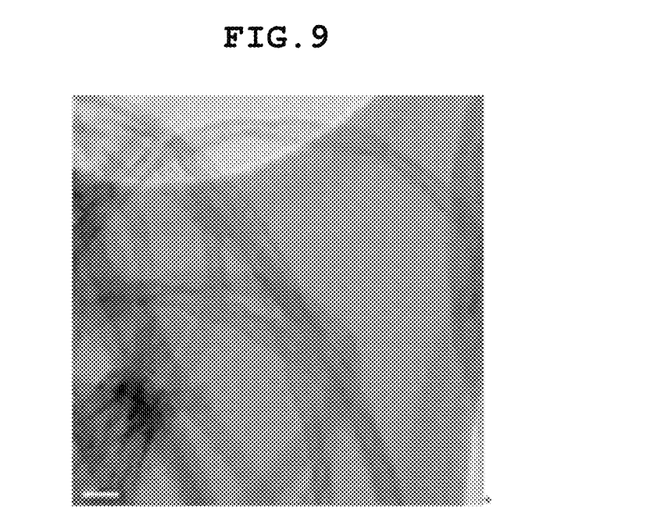
FIG. 9 is a TEM image of CNTs treated at 1800° C.
Figure 10:
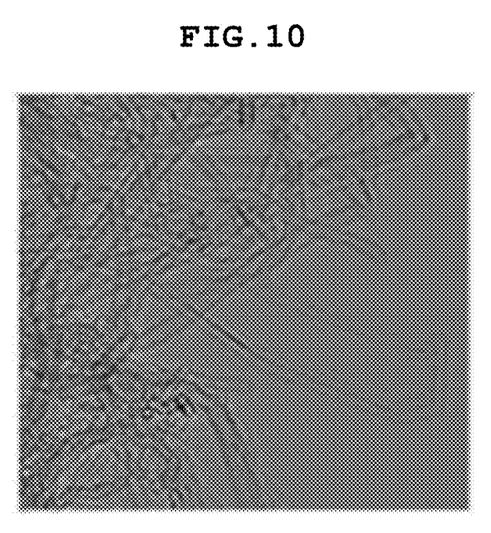
FIG. 10 is a TEM image of CNTs treated at 2500° C.

Also, the TEM images of the carbon nanotubes treated at 1800° C. and 2500° C. are shown in FIGS. 9 and 10, respectively.

The carbon nanotubes are reported to actively cause graphitization thereof upon annealing at 1800 to 2200° C. in an argon gas atmosphere slightly higher than atmospheric pressure (Chen et al. 2007). In conventional techniques, graphitization is known to reduce the incidence of chemical surface defects of carbon nanotubes, but there has been no study on the dispersibility thereof.

Based on the results of TEM analysis of FIGS. 9 and 10, the carbon nanotubes treated at 2500° C. had a large number of bent structures, and the structure of the carbon nanotubes treated at 1800° C. was relatively gentle. In the present invention, upon high-temperature treatment, graphitization occurred more actively, but the growth layers of the carbon nanotubes were bent and entangled, thus adversely affecting dispersibility.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A method of purifying carbon nanotubes, comprising:
   (1) treating carbon nanotubes with an inert gas at a treatment temperature of 1800° C. or less in a low vacuum at a reaction pressure of 0.1 Torr or more in a reactor; and
   (2) obtaining ultrapure carbon nanotubes,
wherein the ultrapure carbon nanotubes contain 50 ppm or less of each metal remaining therein.

2. The method of claim 1, wherein Fe is present in an amount of 10 ppm or less, when the metal remaining in the ultrapure carbon nanotubes is Fe.

3. The method of claim 1, wherein the low vacuum is set at a reaction pressure ranging from 0.1 Torr to 1 Torr.

4. The method of claim 1, wherein the treatment temperature ranges from 1600° C. to 1800° C.

5. The method of claim 1, wherein the inert gas is used in an amount of 0.0025 to 0.25 times a volume of the reactor per minute.

6. The method of claim 1, wherein the treating the carbon nanotubes is performed for 15 min to 120 min.

7. The method of claim 1, wherein the remaining metal includes Fe, Co, $Al_2O_3$, Mg or a combination thereof.

* * * * *

UNITED STATES PATENT AND TRADEMARK OFFICE
CERTIFICATE OF CORRECTION

PATENT NO. : 10,703,632 B2  
APPLICATION NO. : 15/694213  
DATED : July 7, 2020  
INVENTOR(S) : Yeon Hwa La et al.

Page 1 of 1

It is certified that error appears in the above-identified patent and that said Letters Patent is hereby corrected as shown below:

On the Title Page

Item (73) Assignee: Please add the second Assignee: -- SK GLOBAL CHEMICAL CO., LTD., Seoul (KR) --

Signed and Sealed this
First Day of April, 2025

Coke Morgan Stewart
*Acting Director of the United States Patent and Trademark Office*